United States Patent [19]

Kawasaki et al.

[11] 4,429,973

[45] Feb. 7, 1984

[54] COMPENSATION FOR DIAPHRAGM CONTROL FOR SLR CAMERA

[75] Inventors: Masahiro Kawasaki, Tokyo; Fumio Urano, Omiya; Yasumasa Tomori, Sakado, all of Japan

[73] Assignee: Asahi Kogaku Kogyo Kabushiki Kaisha, Tokyo, Japan

[21] Appl. No.: 355,767

[22] Filed: Mar. 8, 1982

[51] Int. Cl.³ .......................... G03B 7/095; G03B 7/20
[52] U.S. Cl. .................................. 354/455; 354/271.1
[58] Field of Search ..................... 354/43, 46, 271, 286

[56] References Cited

U.S. PATENT DOCUMENTS

| 4,079,386 | 3/1978 | Murakami et al. | 354/271 X |
| 4,150,889 | 4/1979 | Ueda et al. | 354/286 X |
| 4,198,141 | 4/1980 | Tominaga et al. | 354/46 |

*Primary Examiner*—Michael L. Gellner
*Attorney, Agent, or Firm*—Christie, Parker & Hale

[57] ABSTRACT

In a camera having a displaceable actuator and a diaphragm adjustable between a maximum aperture value and a minimum aperture value responsive to displacement of the actuator, displacement of the actuator is arrested responsive to first, second, and third signals when the diaphragm is adjusted to the desired aperture value. The first signal is representative of the displacement of the actuator. The second signal is representative of the desired aperture value of the diaphragm for correct exposure. The third signal is representative of the difference between the minimum aperture value and the maximum aperture value. Preferably, the first, second, and third signals are applied to a microcomputer which controls the arresting of the actuator displacement.

6 Claims, 7 Drawing Figures

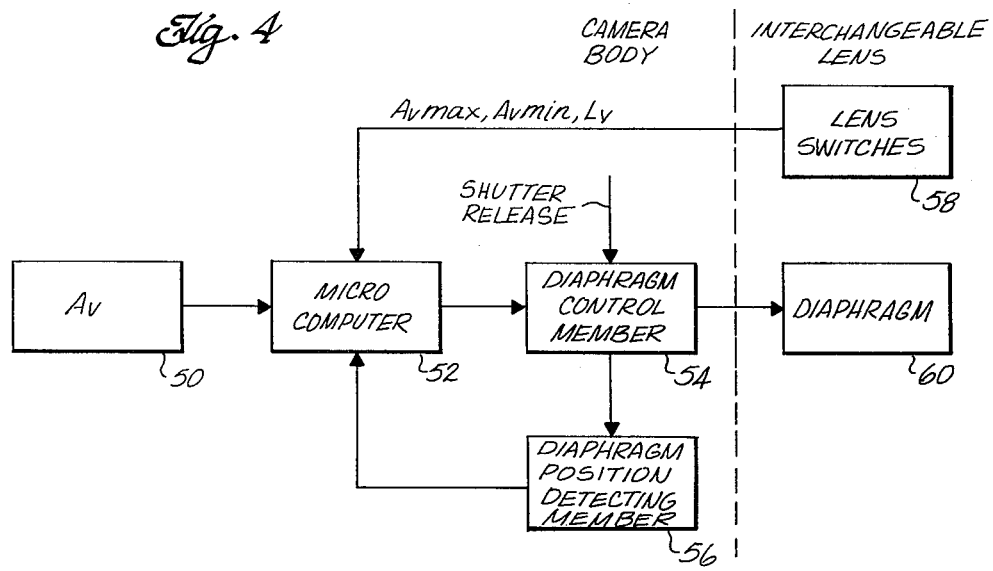
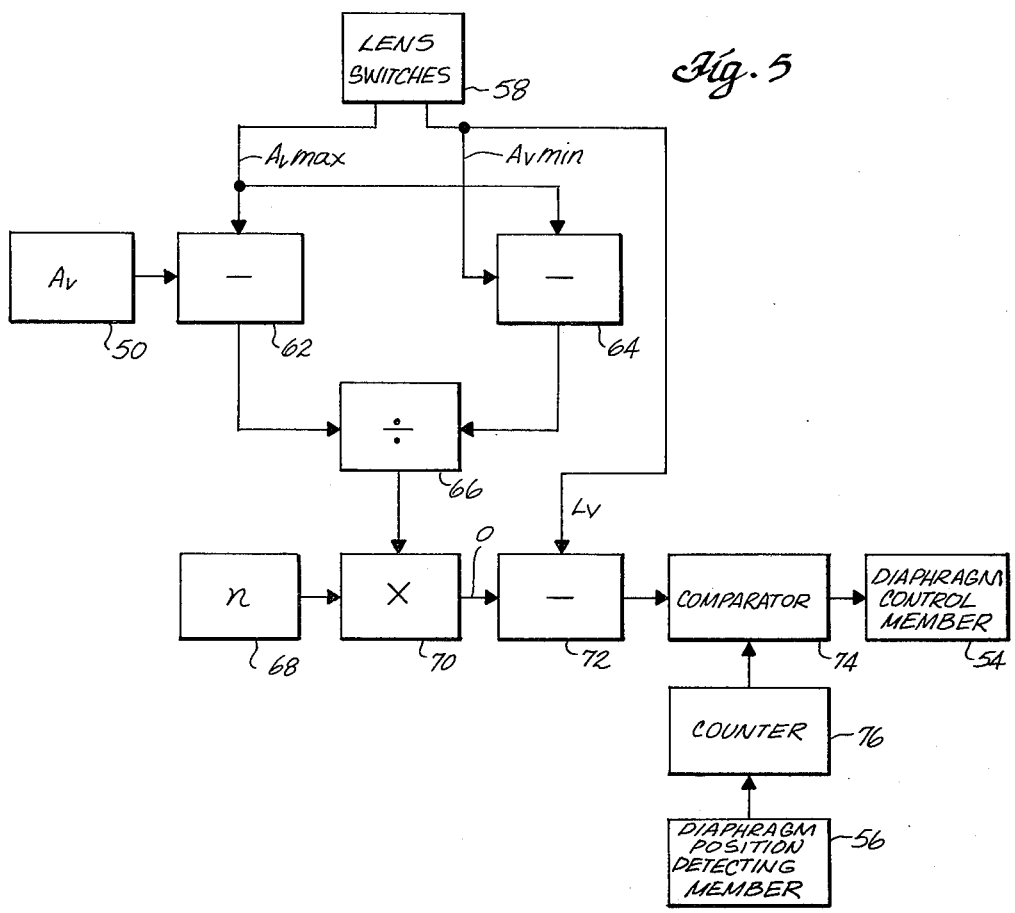

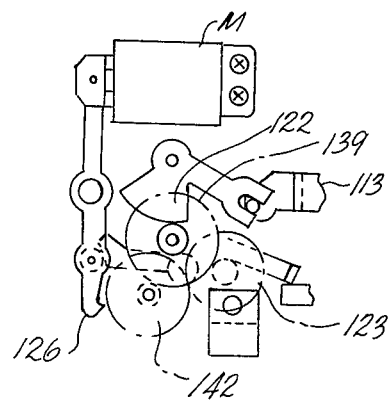
Fig.6
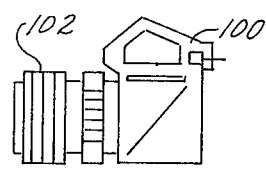
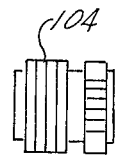
Fig.7

COMPENSATION FOR DIAPHRAGM CONTROL FOR SLR CAMERA

BACKGROUND OF THE INVENTION

The present invention relates to an aperture control mechanism for a single lens reflex camera of lens interchangeable type in which the aperture control is achieved within a predetermined operable range (R) of a diaphragm control member and particularly to such aperture control mechanism utilizing a microcomputer for digital control so as to improve precision, resolution and reproductivity of the aperture control.

The aperture control mechanisms of the prior art have been of the so-called regular interval position control type in which the diaphragm control member has its stroke set in regular intervals with respect to adjacent aperture values of each objective. With the mechanism of such regular interval position control type, however, the stroke (ST) per 1 EV of the diaphragm control member is determined without any variation, based on the operable range (R) of the diaphragm control member and the range of the apex representing values ($\Delta A_v$) corresponding to the aperture adjustable range of a particular objective belonging to a group of interchangeable lenses (hereinafter referred to simply as "aperture adjustable range"). For example, an objective for which the maximum aperture is F1.4 and the minimum aperture is F22, has its aperture adjustable range ($\Delta A_v$) of 8 EV and said stroke (ST) per 1 EV of ST=R/8. In general, so far as the aperture control mechanism is concerned, the larger the stroke (ST) per 1 EV is, the higher the resolution and the precision achieved and the smaller the influence of the other factors such as mechanical play becomes. Usually, photographic cameras of lens interchangeable type utilize an interchangeable lens group typically including an objective having a maximum aperture of F2.8 and a minimum aperture of F22 and an objective having a maximum aperture of F4 and a minimum aperture of F32. The aperture adjustable range ($\Delta A_v$) of such interchangeable objective is 6 EV and for regular interval position control will limit the operable range of the diaphragm control member to 6R/8. Thus, the remainder of 2R/8 will be a useless portion having no effect upon the aperture control, so far as the interchangeable objective having its aperture adjustable range of 6 EV is used.

It is necessary for a correct aperture control to stop down the objective accurately to an aperture value required by the actual condition of an objective to be photographed. However, the usual mechanical control is necessarily accompanied with a time lag from the moment at which the signal is received to the moment at which the mechanism is actually activated in accordance with this signal. Concerning the aperture control member included in the aperture control mechanism according to the prior art, if the signal with which the operation of stopping down is arrested is applied to said diaphragm control member just at the moment at which the diaphragm has been stopped down to the desired aperture value, the diaphragm would be actually stopped down to a position beyond the desired aperture value. To avoid such excessive stopping down, it has been found that said time lag must be compensated by a suitable measure, for example, by slightly earlier generation of the stop signal.

SUMMARY OF THE INVENTION

According to the invention, in a camera having a displaceable actuator and a diaphragm adjustable between a maximum aperture value and a minimum aperture value responsive to displacement of the actuator, displacement of the actuator is arrested responsive to first, second, and third signals when the diaphragm is adjusted to the desired aperture value. The first signal is representative of the displacement of the actuator. The second signal is representative of the desired aperture value of the diaphragm for correct exposure. The third signal is representative of the difference between the minimum aperture value and the maximum aperture value. Preferably, the first, second, and third signals are applied to a microcomputer which controls the arresting of the actuator displacement. Utilization of the third signal in so controlling the diaphragm actuator permits the maintenance of a maximum stroke as lenses having different characteristics are interchanged. Accordingly, the resolution and precision of an automatic diaphragm adjustment operation is improved.

BRIEF DESCRIPTION OF THE DRAWINGS

The features of specific embodiments of the best mode contemplated of carrying out the invention are illustrated in the drawings, in which:

FIG. 4 is a block diagram of the parts of a camera pertinent to the invention;

FIG. 5 is a block diagram of a hard-wired alternative to the microcomputer of FIG. 1;

FIG. 6 is a schematic diagram of the diaphragm control mechanism; and

FIG. 7 is a side view of a camera body and two interchangeable lenses.

DETAILED DESCRIPTION OF THE SPECIFIC EMBODIMENTS

Figure 1:
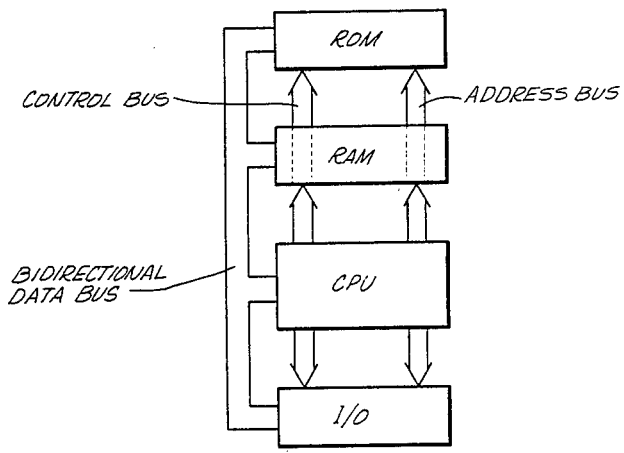
FIG. 1 is a schematic block diagram of a microcomputer used to practice the invention in the preferred embodiment.

In view of the above-mentioned considerations, the present invention provides an arrangement such that the stroke (ST) per 1 EV of the diaphragm control member of each interchangeable objective is variable according to the aperture adjustable range of this particular objective, resulting in improvement of the resolution and the precision of the aperture control mechanism.

The present invention also provides an aperture control mechanism in which stopping down of the diaphragm occurring within the operable range of the diaphragm control member is converted into the corresponding number of pulses so that the diaphragm position detection is possible with high reproductivity and an excessive stopping down due to time lag of the mechanical operation may be easily compensated.

According to the present invention, based on the apex representing value ($A_{vmax}$) corresponding to the maximum F value, the apex representing value ($A_{vmin}$) corresponding to the minimum F value of the interchangeable objective and the operable range (R) of the diaphragm control member, the stroke (ST) per 1 EV is determined by using a microcomputer serving as the arithmetic so that the following equation may be met:

$$ST \approx R/\Delta A_v, \quad (1)$$

where $$\Delta A_v = A_{vmin} - A_{vmax}.$$

Instead of a sign of equality, a sign of approximate equality ($\approx$) is used in the expression (1) for the reason that the stroke (ST) per 1 EV is not necessarily in inverse strict proportion to all the $\Delta A_v$ values but variations of the ST value can be within a range to satisfy an approximation of the expression (1). This achieves the desired improvement according to which the stroke per 1 EV is adjusted to take into account changes in $\Delta A_v$ from objective to objective.

According to the present invention, there is further provided a member adapted to detect the position to which the diaphragm has been stopped down and to generate n pulses depending on the operable range of the diaphragm control member. An apex representing value ($A_v$) corresponding to a desired aperture value, which depends on factors such as the light intensity of the object to be photographed, is inputted to said arithmetic circuit. The number of pulses generated by said diaphragm position detecting member is counted and compared with the number of pulses D representative of the desired aperture value is generated in said arithmetic circuit by computing the following equation to control the position to which the diaphragm should be actually stopped down:

$$D = n(ST/R)(A_v - A_{vmax}). \quad (2)$$

Assuming that the diaphragm control member has its operable range, R, of 6.4 mm and said diaphragm position detecting member can generate 64 pulses in total (n=64), according to equation (1), the relationship will be established among the aperture adjustable range ($\Delta A_v$), the stroke (ST) per 1 EV and the resolution per 1 EV as seen in the following list.

| Aperture adjustable range ($\Delta A_v$) $A_{vmin} - A_{vmax}$ (EV) | Stroke per 1 EV ST (mm/EV) | Resolution per 1 n(ST/R) EV |
|---|---|---|
| $\Delta A_v \geq 8$ | 0.8 | 8 |
| $8 > \Delta A_v \geq 7$ | 0.9 | 9 |
| $7 > \Delta A_v \geq 6$ | 1.0 | 10 |
| $6 > \Delta A_v$ | 1.2 | 12 |

In determination of the stroke (ST) per 1 EV using equation (1), the number 8 in the case of $\Delta A_v \geq 8$, the number 7 in the case of $8 > \Delta A_v \geq 7$, the number 6.4 in the case of $7 > \Delta A_v \geq 6$, and the number 5 in the case of $6 > \Delta A_v$ have been adopted as the average $\Delta A_v$. The resolution per 1 EV is obtained in such manner that the stroke (ST) per 1 EV is divided by the operable range of the diaphragm control member (6.4) mm in this example) and the resulting value is multiplied by the total number n of pulses (64 pulese in this example). This means that a difference of 1 EV is caused by generation of a number of pulses equal to the number in the rightmost column of the list for each value of $\Delta A_v$. The resolution as listed will be now compared with the case of the previously mentioned regular interval position control. With this regular interval position control, the stroke per 1 EV is uniformly 0.8 mm and the resolution per 1 EV is also uniformly 8 for every interchangeable lens. According to the present invention, on the contrary, the stroke per 1 EV is 1.0 mm and the resolution per 1 EV is 10 for almost every interchangeable lens (having $\Delta A_v$ of approximately 6). Thus, both the stroke and the resolution are improved by the present invention. Although the aperture adjustable range ($\Delta A_v$) is divided into segments corresponding to 1 EV in the example above listed, it will be obvious to those skilled in the art that said aperture adjustable range ($\Delta A_v$) may be more finely divided without departure from the scope of the present invention.

In FIG. 7 are shown a camera body 100, a removable lens assembly 102 inserted in camera body 100 and a lens asssembly 104 interchangeable with lens assembly 102 and insertable in camera body 100 when substituted for lens assembly 102.

In FIG. 4, an $A_v$ source 50, a microcomputer 52, a diaphragm control member 54, and a diaphragm position detecting member 56 are disposed in a camera body. Lens switches 58 and a diaphragm 60 are disposed in each of a plurality of interchangeable lenses to be individually mounted on the camera body. Source 50 generates a binary signal representative of the desired aperture value ($A_v$) of diaphragm 60 for correct exposure taking into account the sensitivity of the film, the shutter speed, and the light intensity illuminating the object to be photographed, among other factors. Diaphragm 60 is adjustable between a maximum aperture value ($A_{vmax}$) and a minimum aperture value ($A_{vmin}$) that depend upon the particular lens. Lens switches 58 generate a binary signal representative of the maximum aperture value ($A_{vmax}$), a binary signal representative of the minimum aperture value ($A_{vmin}$), and, if desired, a binary signal representative of another characteristic ($L_v$) of the particular lens, such as lag time of arresting diaphragm stop down responsive to a stop signal. These binary signals are coupled to microcomputer 52 in the camera body, for example by a series of switches constructed in the manner disclosed in application Ser. No. 137,987, filed Feb. 25, 1981, the disclosure of which is incorporated fully herein by reference. Responsive to release of the shutter in the camera body, diaphragm control member 54, which serves as a displaceable actuator for diaphragm 60, stops down diaphragm 60. A diaphragm position detecting member 56 generates pulses, each representing an incremental displacement of member 54 and thus diaphragm 60. These pulses are counted in microcomputer 52. The cumulative count of these pulses is a binary signal representative of the displacement of member 54 and thus diaphragm 60. Microcomputer 52 also generates a binary signal representative of a number of pulses D by solving equation 2 with which the counted pulses from member 56 are compared. When the two arrive at a predetermined relationship, e.g., equality, microcomputer 52 generates a stop signal to arrest the displacement of member 54 and thus terminates stop down of diaphragm 60. If desired, binary signal $L_v$ representative of the lag time could also be coupled from lens switches 58 to microcomputer 52 to compensate for the lag time of member 54 in response to the stop signal from microcomputer 52. Reference is made to application Ser. No. 235,840, filed Feb. 19, 1981, application Ser. No. 235,839, filed Feb. 19, 1981, and application Ser. No. 258,044, filed Apr. 28, 1981, for exemplary embodiments of source 50, diaphragm control member 54, including the mechanism for arresting its displacement, and diaphragm position detecting member 56. As represented in FIG. 6, a diaphragm control magnet M, which is energized while diaphragm 60 stops down, is deenergized to arrest the displacement of diaphragm control member 54. This process is described in detail in application Ser. No. 258,044, now U.S. Pat. No. 4,360,257. Upon shutter release, a slide plate 113, which is coupled to diaphragm control member 54, moves in a downward direction. Its movement is coupled through a sector gear 122, a transmission gear 139, and a gear 142 to a code disc 123. As code disc 123 rotates, light pulses are generated in diaphragm position detecting member 56. Deenergization of magnet M causes a locking tooth 126 to engage a tooth of gear 142, thereby arresting further movement of diaphragm control member 54. Code disc 123 interrupts a light beam transmitted from a light source to a light detector thereby producing at the light detector a series of pulses representative in number of the displacement of the diaphragm control member 54. Reference is also made to application Ser. No. 235,840 for a disclosure of the use of an electrical quantity representative of lens characteristics such as lag time and speed of stop down as compensation for different interchangeable lenses in an automatic diaphragm control process. The disclosures of these applications are incorporated fully herein by reference.

Referring to FIG. 1, microcomputer 52 includes ROM 10, RAM 12, CPU 14, and I/O 16 coupled via an address bus 18, a control bus 20, a bidirectional bus 22, and an I/O bus 24, respectively. There are available many products on the market, constructed in a single integrated circuit chip suitable for use as the microcomputer of such type. Now the control circuit incorporated into the aperture control mechanism will be described for the case in which Model 8080 of INTEL Corp. is used as CPU 14.

Figure 2:
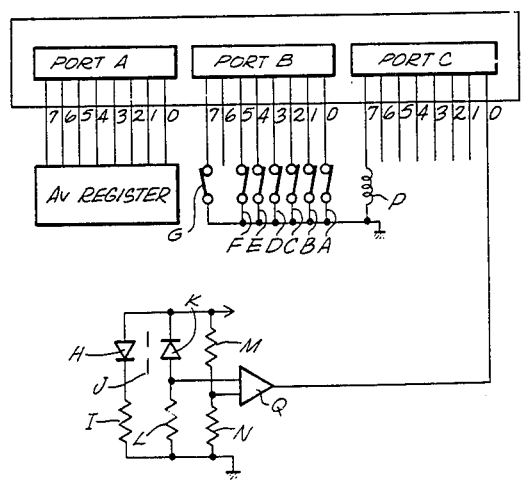
FIG. 2 is a schematic diagram of the input/output unit of FIG. 1.

Referring to FIG. 2, which illustrates the case where a programmable peripheral interface INTEL Model 8255A is used as I/O in FIG. 1, Port A and Port B are set as inputs, lower 4 bits of Port C are set as input, and higher 4 bits of Port C are set as output in accordance with a program. To the Port A, an $A_v$ register is connected, which is adapted to hold a desired $A_v$ value determined by factors such as film sensitivity, shutter speed and condition of an object to be photographed in the form of a binary code. Terminals A through F serving as members to provide coded quantities corresponding to the maximum F value and the minimum F value of an interchangeable lens are connected to the Port B so that the maximum F value is input to the lower 4 bits (0 through 3), the minimum F value is input to the fourth and fifth bits and a switch SWG adapted to be opened in synchronization with stopping down is connected to the seventh bit. The signals inputted to the Port A and the Port B are by way of example shown in Table 1. A diaphragm control magnet EEmg designated by P is connected to the seventh bit of the Port C. H designates a light-emitting diode, K a light-receiving element, and J an interrupter. The light-emitting diode H, the interrupter J, the light-receiving element K, a resistance I, resistances L through N, and a comparator Q comprise a diaphragm position detecting member. The interrupter J operates in response to the diaphragm control member to open or close an optical path defined between the light-emitting diode H and the light-receiving element K. Thus, opening and closing said optical path directly corresponds to stopping down of the diaphragm. A divided voltage formed by the light-receiving element K and the resistance L from a voltage source $V_{DD}$ is compared with a divided voltage formed by the resistances M and N in the comparator Q of which the output is an input to the O bit of the Port C. When the interrupter J opens and closes the optical path leading to the light-receiving element K as it is operated by the diaphragm control member, said comparator Q produces output pulses of a waveform which is suitable as the input to the microcomputer. The microcomputer is programmed to count the number of the pulses from comparator Q and to generate a stop signal at the Port C when the counted number of pulses equals D calculated from the formula (2) minus a number of pulses representing the lag time $L_v$, of the diaphragm control member. Said lag time value can be easily measured, and inputted into the microcomputer for each lens, if desired.

Figure 3:
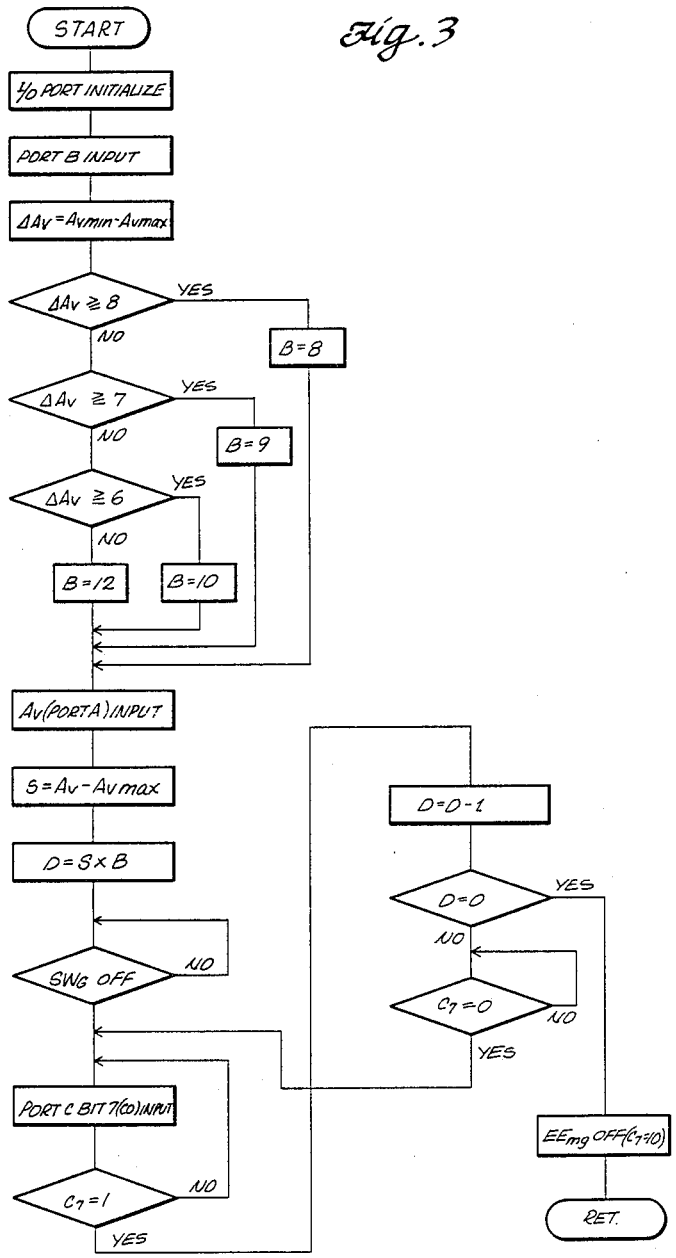
FIG. 3 is a flow diagram of the program executed by the microcomputer of FIG. 1.

FIG. 3 is a flow chart illustrating how the stroke and the resolution per 1 EV are improved, with reference to Table 1. Table 2 shows a program corresponding to this flow chart with mnemonic symbols and computer machine language. In Table 2, I/O addresses are FB with respect to the control word, F8 with respect to the Port A, F9 with respect to the Port B and FA with respect to the Port C.

In FIG. 5 is shown a hard-wired alternative to microcomputer 52. $A_{vmax}$ and $A_v$ are supplied to the inputs of a substraction circuit 62. $A_{vmax}$ and $A_{vmin}$ are applied to the inputs of a subtraction circuit 64. The output of subtraction circuit 64 is applied to one input of a division circuit 66 and the output of substraction circuit 62 is applied to the other input of division circuit 66. The output of division circuit 66 and the output of a signal source 68 representative of n are applied to the inputs of a multiplication circuit 70. The output of multiplication circuit 70, which is D, i.e., a signal representative of the desired aperture value, is applied to one input of a subtraction circuit 72. $L_v$ is applied to the other input of circuit 72. The output of circuit 72 is applied to one input of a comparator 74. The output of diaphragm position detecting member 56 (FIG. 4) is applied to the input of a counter 76. The output of counter 76 is applied to the other input of comparator 74. The output of comparator 74 is applied as the stop signal to diaphragm control member 54 (FIG. 4)

In accordance with the present invention, the stroke (ST) per 1 EV of the diaphragm control member is adjustable, depending on the aperture adjustable lens so that, for most interchangeable lenses, said stroke per 1 EV is effectively maximized to provide an aperture control mechanism of high precision and resolution. The microcomputer of a single chip type which is generally available on the market suffices to adjust said stroke and, therefore, not only the manufacturing cost substantially remains unchanged but also improvement in the diaphragm control efficiency and additional functions can be achieved in comparison to the aperture control mechanism of the prior art. Furthermore, a quantity corresponding to the operating position of the diaphragm control member at every moment can be generated in real time in a digital manner according to the present invention so that the diaphragm position can be accurately detected and said improvement of the stroke per 1 EV is achieved, thereby to provide the aperture control mechanism with high precision, resolution, and reproducability. In addition, D given by the formula (2) may be increased or decreased to compensate for different characteristic, e.g., lag time, from lens to lens. Thus, for example, excessive stopping down due to time lag which is present in the usual mechanical operation may be easily compensated.

TABLE 1

1. List of $A_v$ register codes (Port A)

| $A_v$ register bit 76543210 | $A_v$ | F-values |
|---|---|---|
| 00000000 | 0 | 1 |
| 00010000 | 1 | 1.4 |
| 00100000 | 2 | 2 |
| 00110000 | 3 | 2.8 |
| 01000000 | 4 | 4 |
| 01010000 | 5 | 5.6 |
| 01100000 | 6 | 8 |
| 01110000 | 7 | 11 |
| 10000000 | 8 | 16 |
| 10010000 | 9 | 22 |
| 10100000 | 10 | 32 |
| 10110000 | 11 | 45 |

2. List of maximum F-value codes (Port B)

| maximum F-value bit 3210 | $A_{vmax}$ | F-values |
|---|---|---|
| 0000 | 0.5 | 1.2 |
| 0001 | 1 | 1.4 |
| 0010 | 1.5 | 1.7 |
| 0011 | 2 | 2 |
| 0100 | 2.5 | 2.5 |
| 0101 | 3 | 2.8 |
| 0110 | 3.5 | 3.5 |
| 0111 | 4 | 4 |
| 1000 | 4.5 | 4.5 |
| 1001 | 5 | 5.6 |

3. List of minimum F-value codes (Port B)

| minimum F-values bit 54 | $A_{vmin}$ | F-value |
|---|---|---|
| 00 | 9 | 22 |
| 01 | 10 | 32 |
| 10 | 11 | 45 |

TABLE 2

| | | | | |
|---|---|---|---|---|
| 1000 | 3E93 | Start | MVI A,93 | I/O Port initialize |
| 2 | D3FB | | OUT FB | Port A input Port B input Port C higher output Port C lower input |
| 4 | 3E80 | | MVI A,80 | |
| 6 | D3FA | | OUT FA | EEmg energize |
| 8 | DBF9 | | IN F9 | Port B input |
| A | 4F | | MOV C,A | |
| B | C602 | | ADI 02 | |
| D | 0F | | RRC | |
| E | E607 | | ANI 07 | |
| 10 | 67 | | MOV H,A | |
| 1 | 79 | | MOV A,C | |
| 2 | 0F | | RRC | |
| 3 | 0F | | RRC | |
| 4 | 0F | | RRC | |
| 5 | 0F | | RRC | |
| 6 | E603 | | ANI 03 | |
| 8 | C609 | | ADI 09 | |
| A | 94 | | SUB H | $\Delta A_v = A_{vmin} - A_{vmax}$ |
| B | FE08 | | CPI 08 | $\Delta A_v$ 8 |
| D | 0608 | | MVI B,08 | B = 8 |
| F | F23210 | | JP Loop1 | |
| 22 | FE07 | | CPI 07 | $\Delta A_v$ 7 |
| 4 | 0609 | | MVI B,09 | B 9 |
| 6 | F23210 | | JP Loop1 | |
| 9 | FE06 | | CPI 06 | $\Delta A_v$ 6 |
| B | 060A | | MVI B,0A | B 10 |
| D | F23210 | | JP Loop1 | |
| 30 | 060C | | MVI B,0C | B 12 |
| 2 | 79 | Loop1 | MOV A,C | |
| 3 | 07 | | RLC | |
| 4 | 07 | | RLC | |
| 1035 | 07 | | RLC | |
| 6 | E678 | | ANI 78 | |
| A | 67 | | MOV H,A | |
| B | DBF8 | | IN F8 | Port A input |

TABLE 2-continued

| | | | | |
|---|---|---|---|---|
| D | 94 | | SUB H | |
| E | 67 | | MOV H,A | $S = A_v - A_{vmax}$ |
| F | 1600 | | MVI D,00 | |
| 41 | 05 | Loop2 | DCR B | |
| 2 | CA4D10 | | JZ Loop4 | |
| 5 | 84 | | ADD H | |
| 6 | D24A10 | | JNC Loop3 | |
| 9 | 14 | | INR D | |
| A | C34110 | Loop3 | JMP Loop2 | |
| D | 0F | Loop4 | RRC | |
| E | 0F | | RRC | |
| F | 0F | | RRC | |
| 50 | 0F | | RRC | |
| 1 | 5F | | MOV E,A | |
| 2 | 7A | | MOV A,D | |
| 3 | 07 | | RLC | |
| 4 | 07 | | RLC | |
| 5 | 07 | | RLC | |
| 6 | 07 | | RLC | |
| 7 | 83 | | ADD F | |
| 8 | 57 | | MOV D,A | $D = S \times B$ |
| 9 | DBF9 | Loop5 | IN F9 | SWG off ? |
| B | 07 | | RLC | |
| C | D25910 | | JNC Loop5 | |
| F | 00 | | NOP | |
| 60 | DBFA | Loop6 | IN FA | |
| 2 | 0F | | RRC | |
| 3 | D26010 | | JNC Loop6 | $C_7 = 1$ ! |
| 6 | 15 | | DCR D | $D = D - 1$ |
| 7 | CA7410 | | JZ Loop8 | |
| A | DBFA | Loop7 | IN FA | |
| C | 0F | | RRC | |
| D | DA6A10 | | JC Loop7 | $C_7 = 0$ ? |
| 70 | C36010 | | JMP Loop6 | |
| 3 | 00 | | NOP | |
| 4 | 3E00 | Loop8 | MVI A,00 | |
| 6 | D3FA | | OUT FA | EEmg off |
| 8 | C9 | | RET | |

What is claimed is:

1. A camera comprising:
a displaceable actuator;
a diaphragm adjustable between a maximum aperture value and a minimum aperture value responsive to displacement of the actuator;
means for generating a first signal representative of the displacement of the actuator;
means for generating a second signal representative of the desired aperture value of the diaphragm for correct exposure, the second signal equaling the desired aperture value minus the maximum aperture value;
means for generating a third signal representative of the difference between the minimum aperture value and the maximum aperture value;
means for displacing the actuator upon shutter release to adjust the diaphragm; and
means responsive to the first, second, and third signals for arresting the displacement of the actuator when the diaphragm is adjusted to the desired aperture value, the arresting means comprising means for dividing the second signal by the third signal to derive a fourth signal, means for comparing the fourth signal with the first signal, a diaphragm control magnet that arrests displacement of the actuator responsive to a binary signal of a given value, and means responsive to the comparing means for applying to the control magnet a binary signal of the given value when the fourth signal and the first signal assume a predetermined relationship.

2. The camera of claim 1, in which the means for generating a first signal comprises means for generating pulses corresponding to incremental displacement of the actuator, means for counting the pulses, and means for generating as the first signal a representation of the number of counted pulses.

3. The camera of claim 2, additionally comprising means for generating a fifth signal representative of characteristics of the lens assembly, the applying means applying the binary signal to the control magnet when the fourth signal minus the fifth signal equals the first signal.

4. A camera comprising:
a camera body;
a displaceable actuator;
first and second lens assemblies interchangeably insertable into the camera body, each lens assembly having a diaphragm adjustable between a maximum aperture value and a minimum aperture value responsive to displacement of the actuator;
means for generating a first signal representative of the displacement of the actuator;
means in the camera housing for generating a second signal representative of the desired aperture value of the diaphragm for correct exposure, the second signal equaling the desired aperture value minus the maximum aperture value for the lens assembly inserted in the camera body;
means for displacing the actuator upon shutter release;
means for generating a third signal representative of the difference between the minimum aperture value and the maximum aperture value; and
means responsive to the first, second, and third signals for arresting the displacement of the actuator when the diaphragm is adjusted to the desired aperture value, the arresting means comprising means for dividing the second signal by the third signal to derive a fourth signal, means for comparing the fourth signal with the first signal, a diaphragm control magnet that arrests displacement of the actuator responsive to a binary signal of a given value, and means responsive to the comparing means for applying to the control magnet a binary signal of the given value when the fourth signal and the first signal assume a predetermined relationship.

5. The camera of claim 4, in which the means for generating a first signal comprises means for generating pulses corresponding to incremental displacement of the actuator, means for counting the pulses, and means for generating as the first signal a representation of the number of counted pulses.

6. The camera of claim 5, additionally comprising means for generating a fifth signal representative of characteristics of the first lens assembly and a sixth signal different from the fifth signal representative of characteristics of the second lens assembly, the applying means applying the binary signal to the control magnet when the fourth signal minus one of the fifth and sixth signals equals the first signal.

* * * * *